US011201926B2

(12) United States Patent
Singleton, IV et al.

(10) Patent No.: US 11,201,926 B2
(45) Date of Patent: *Dec. 14, 2021

(54) COMPUTING SYSTEM PROVIDING CLOUD-BASED USER PROFILE MANAGEMENT FOR VIRTUAL SESSIONS AND RELATED METHODS

(71) Applicant: CITRIX SYSTEMS, INC., Fort Lauderdale, FL (US)

(72) Inventors: Leo C Singleton, IV, Fort Lauderdale, FL (US); Avijit Gahtori, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,045

(22) Filed: Jul. 1, 2020

(65) Prior Publication Data

US 2020/0336549 A1 Oct. 22, 2020

Related U.S. Application Data

(63) Continuation of application No. 15/889,394, filed on Feb. 6, 2018, now Pat. No. 10,728,343.

(51) Int. Cl.
*H04L 29/08* (2006.01)
*H04L 29/06* (2006.01)
(Continued)

(52) U.S. Cl.
CPC .......... *H04L 67/141* (2013.01); *G06F 9/5072* (2013.01); *H04L 12/4641* (2013.01);
(Continued)

(58) Field of Classification Search
CPC . H04L 63/0807; H04L 67/141; H04L 67/306; H04L 29/06; H04L 63/0884;
(Continued)

(56) References Cited

U.S. PATENT DOCUMENTS

| 8,725,791 B2 | 5/2014 | Nord et al. |
| 8,850,455 B1 * | 9/2014 | Bachu ................. G06F 11/1458 719/313 |

(Continued)

FOREIGN PATENT DOCUMENTS

WO    WO2014210175    12/2014

OTHER PUBLICATIONS

Anonymous "Profile management" https://www.citrix.com/go/jmp/upm.html: retrieved from internet Jan. 5, 2018, pp. 3.

(Continued)

*Primary Examiner* — Ninos Donabed
(74) *Attorney, Agent, or Firm* — Allen, Dyer, Doppelt + Gilchrist, PA (57) ABSTRACT

A virtualization server may include a memory and a processor cooperating with the memory to operate a virtual session controller. The virtual session controller may be configured to assign virtual sessions to a plurality of different client devices, each virtual session having a respective user profile associated therewith, maintain a respective unique access token associated with each user profile separate from the client devices, relay the access tokens to a cloud computing service, receive the user profiles from the cloud computing service responsive to the unique access tokens, and synchronize with the cloud computing service changes in the user profiles responsive to the user sessions based upon the respective access tokens.

17 Claims, 5 Drawing Sheets

(51) Int. Cl.
*H04L 12/46* (2006.01)
*G06F 9/50* (2006.01)

(52) U.S. Cl.
CPC ...... *H04L 67/1095* (2013.01); *H04L 67/1097* (2013.01); *H04L 67/18* (2013.01); *H04L 67/306* (2013.01); *H04L 67/42* (2013.01)

(58) Field of Classification Search
CPC . H04L 67/18; H04L 12/4641; H04L 67/1095; H04L 67/1097; H04L 67/42; H04L 63/083; H04L 63/0853; G06F 9/5072
See application file for complete search history.

(56) References Cited

U.S. PATENT DOCUMENTS

| | | | |
|---|---|---|---|
| 8,856,783 B2 | 10/2014 | Sharp et al. | |
| 8,970,450 B2 | 3/2015 | Momchilov | |
| 9,143,530 B2* | 9/2015 | Qureshi | H04L 63/20 |
| 9,317,547 B1* | 4/2016 | Bachu | G06F 16/22 |
| 9,451,044 B2 | 9/2016 | Nord et al. | |
| 9,471,331 B2 | 10/2016 | Kludy et al. | |
| 9,819,538 B2 | 11/2017 | Kludy et al. | |
| 9,838,249 B2 | 12/2017 | Kludy et al. | |
| 9,948,610 B2 | 4/2018 | Broadbent et al. | |
| 10,218,678 B2 | 2/2019 | Broadbent et al. | |
| 10,581,995 B1* | 3/2020 | Kudrin | H04L 67/1095 |
| 2007/0117629 A1* | 5/2007 | Fowler | A63F 13/12 463/42 |
| 2007/0117630 A1* | 5/2007 | Fowler | G07F 17/3223 463/42 |
| 2007/0130150 A1* | 6/2007 | Fowler | G07F 17/3232 |
| 2009/0063995 A1 | 3/2009 | Baron et al. | |
| 2010/0310078 A1* | 12/2010 | Kim | H04L 63/0823 380/282 |
| 2011/0119169 A1* | 5/2011 | Passero | G06Q 40/00 705/35 |
| 2011/0153502 A1 | 6/2011 | Jean-Claude | |
| 2012/0054744 A1* | 3/2012 | Singh | G06F 9/45558 718/1 |
| 2012/0066679 A1 | 3/2012 | Pappas et al. | |
| 2012/0072898 A1* | 3/2012 | Pappas | G06F 21/10 717/171 |
| 2012/0078720 A1 | 3/2012 | Pappas et al. | |
| 2012/0173731 A1 | 7/2012 | Lin et al. | |
| 2012/0226742 A1 | 9/2012 | Momchilov et al. | |
| 2012/0240224 A1* | 9/2012 | Payne | H04L 63/1416 726/21 |
| 2012/0324365 A1 | 12/2012 | Momchilov et al. | |
| 2013/0074179 A1 | 3/2013 | Das et al. | |
| 2013/0185772 A1 | 7/2013 | Jaudon et al. | |
| 2013/0205373 A1 | 8/2013 | Jaudon et al. | |
| 2013/0332727 A1 | 12/2013 | Jaudon et al. | |
| 2014/0108775 A1 | 4/2014 | Kludy et al. | |
| 2014/0245188 A1* | 8/2014 | Berger | G06Q 10/10 715/753 |
| 2014/0282984 A1* | 9/2014 | Schlesinger | H04L 63/0807 726/9 |
| 2014/0310182 A1* | 10/2014 | Cummins | G06Q 20/3274 705/71 |
| 2014/0373120 A1 | 12/2014 | Huang et al. | |
| 2016/0065563 A1* | 3/2016 | Broadbent | H04L 63/0281 726/9 |
| 2017/0214701 A1 | 7/2017 | Hasan | |
| 2018/0183775 A1 | 6/2018 | Malkapuram et al. | |
| 2018/0191700 A1* | 7/2018 | Kong | H04L 41/046 |
| 2018/0191701 A1* | 7/2018 | Kong | H04L 63/083 |
| 2019/0132303 A1* | 5/2019 | Kurian | H04L 63/08 |
| 2019/0306169 A1* | 10/2019 | Statia | H04L 63/0807 |

OTHER PUBLICATIONS

David Wagner "What is user profile manager? How does it work?" https://www.citrix.com/blogs/2008/06/18/what-is-user-profile-manager-how-does-it-work/ Jun. 18, 2008, pp. 3.

Anonymous "Profile management architecture" https://docs.citrix.eom/en-us/profile-management/5/upm-planning-user-store-den.html; Mar. 28, 2017, pp. 9.

\* cited by examiner

COMPUTING SYSTEM PROVIDING CLOUD-BASED USER PROFILE MANAGEMENT FOR VIRTUAL SESSIONS AND RELATED METHODS

RELATED APPLICATIONS

This application is a continuation of U.S. application Ser. No. 15/889,394 filed Feb. 6, 2018, which is hereby incorporated herein in its entirety by reference.

TECHNICAL FIELD

This application generally relates to computer networks, and more particularly to creating and managing virtual sessions in conjunction with a cloud computing environment and related methods.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A virtualization server may include a memory and a processor cooperating with the memory to operate a virtual session controller. The virtual session controller may be configured to assign virtual sessions to a plurality of different client devices, each virtual session having a respective user profile associated therewith, maintain a respective unique access token associated with each user profile separate from the client devices, relay the access tokens to a cloud computing service, receive the user profiles from the cloud computing service responsive to the unique access tokens, and synchronize with the cloud computing service changes in the user profiles responsive to the user sessions based upon the respective access tokens.

In an example embodiment, the virtual session controller may be remotely located from the client devices. In accordance with another example, the virtual session controller may be on-premises with respect to the client devices. In one example implementation, the cloud computing service may be distributed over a plurality of different geographic locations and store the user profiles at the different geographic locations based upon locations of respective users. In another example implementation, the cloud computing service may be distributed over a plurality of different geographic locations and store the user profiles and backups thereof at different geographic locations.

By way of example, the cloud computing service may store the user profiles in blob storage. Also by way of example, the virtual sessions may comprise at least one of virtual desktop sessions and virtual application sessions.

A related method may include operating a virtual session controller to assign virtual sessions to a plurality of different client devices, with each virtual session having a respective user profile associated therewith, and maintain a respective unique access token associated with each user profile separate from the client devices. The virtual session controller may also relay the access tokens to a cloud computing service, receive the user profiles from the cloud computing service responsive to the unique access tokens, and synchronize with the cloud computing service changes in the user profiles responsive to the user sessions based upon the respective access tokens.

A related non-transitory computer-readable medium may have computer-executable instructions for causing a processor to perform steps including operating a virtual session controller to assign virtual sessions to a plurality of different client devices, with each virtual session having a respective user profile associated therewith, and maintain a respective unique access token associated with each user profile separate from the client devices. The virtual session controller may also relay the access tokens to a cloud computing service, receive the user profiles from the cloud computing service responsive to the unique access tokens, and synchronize with the cloud computing service changes in the user profiles responsive to the user sessions based upon the respective access tokens.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
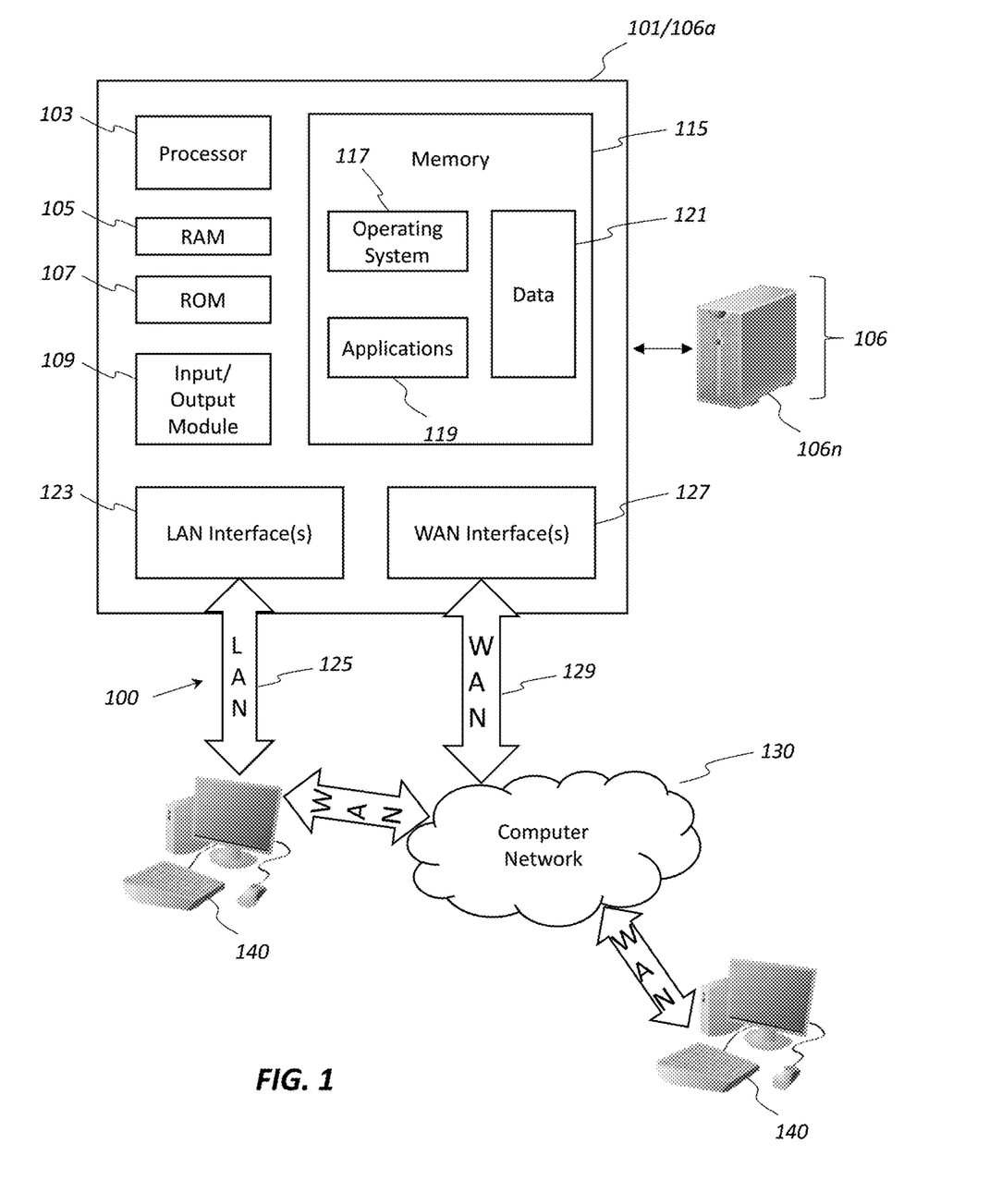
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
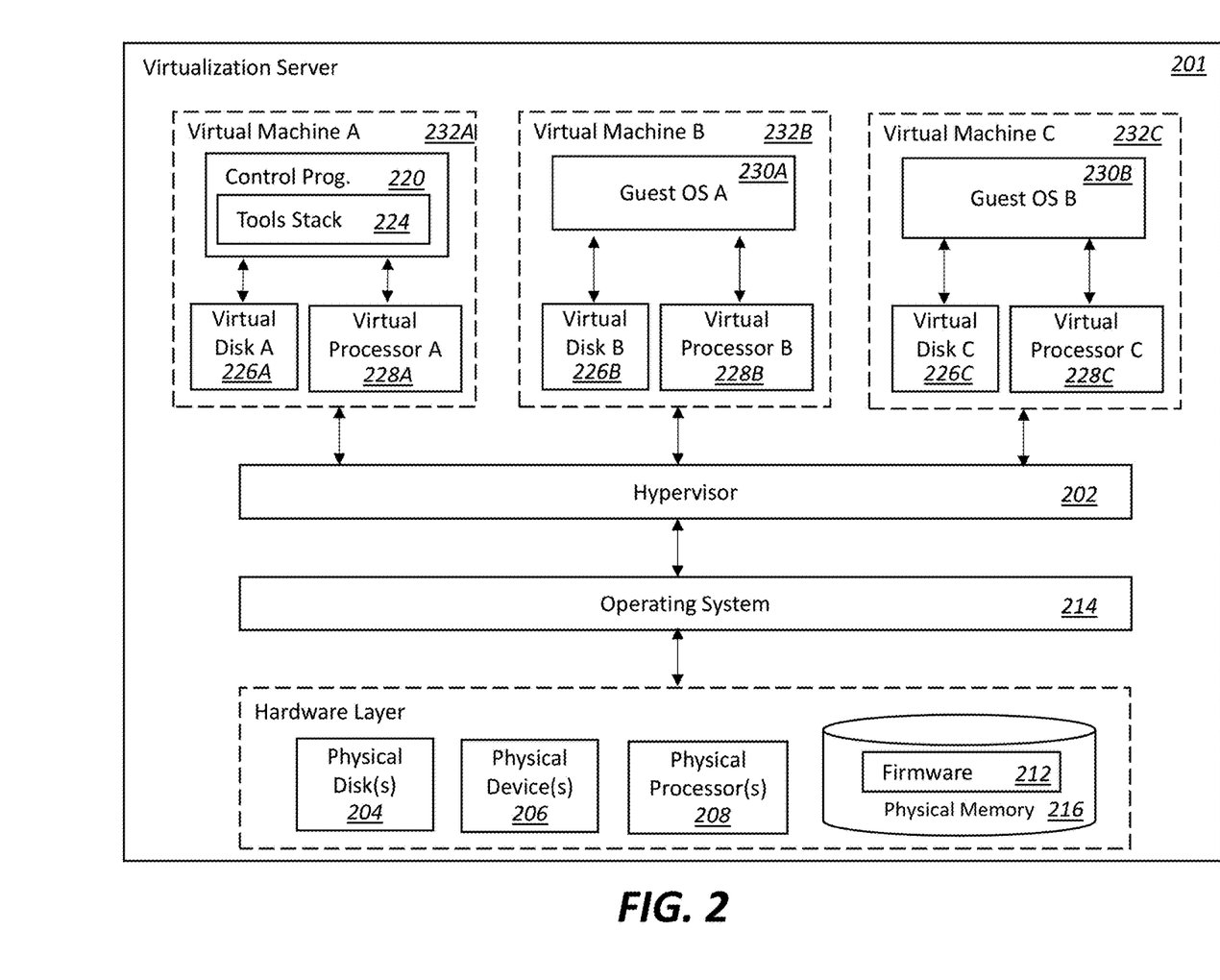
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
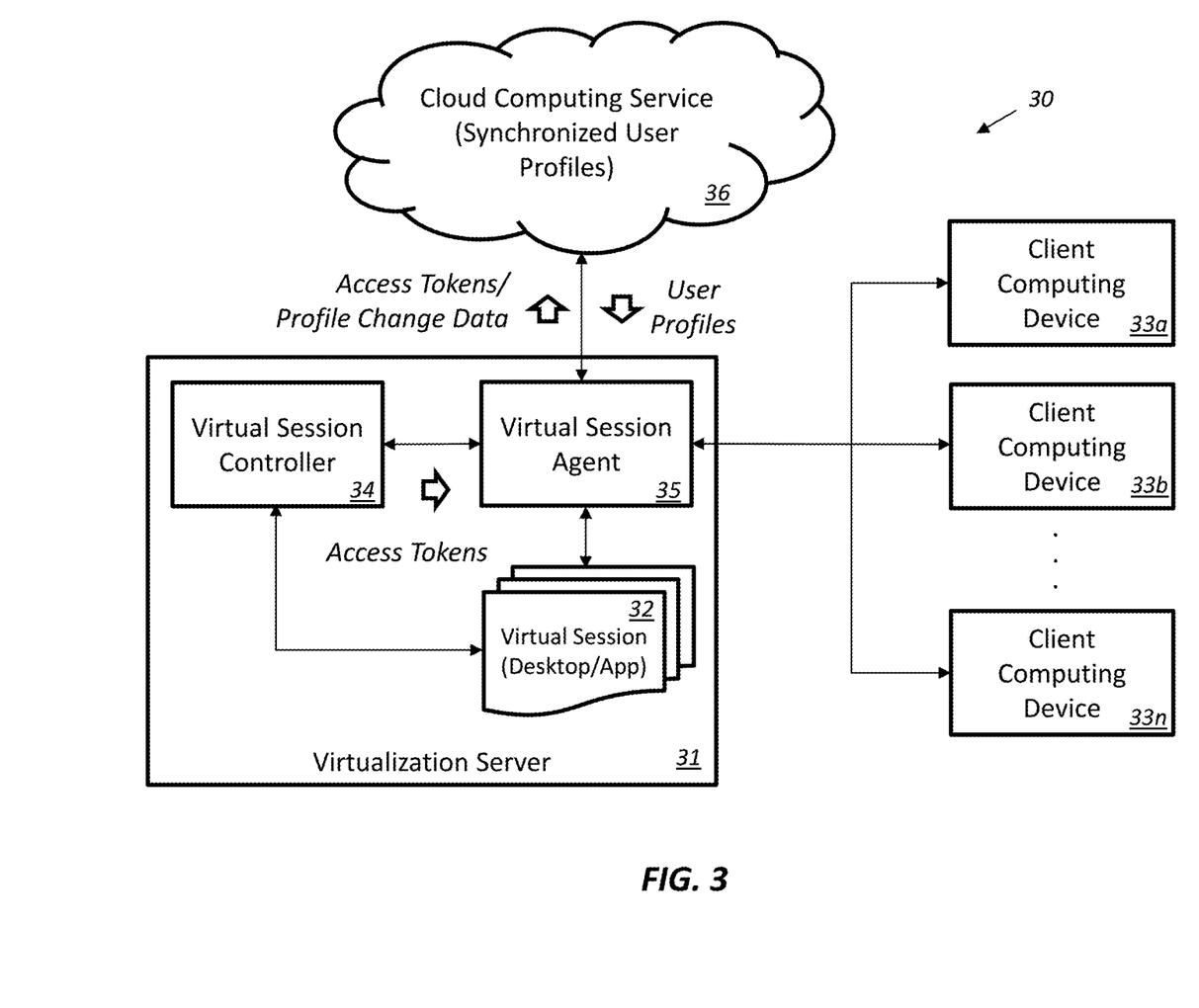
FIG. 3 is a schematic block diagram of a computing system providing cloud-based user profile management for virtual computing sessions in accordance with an example embodiment.
Figure 4:
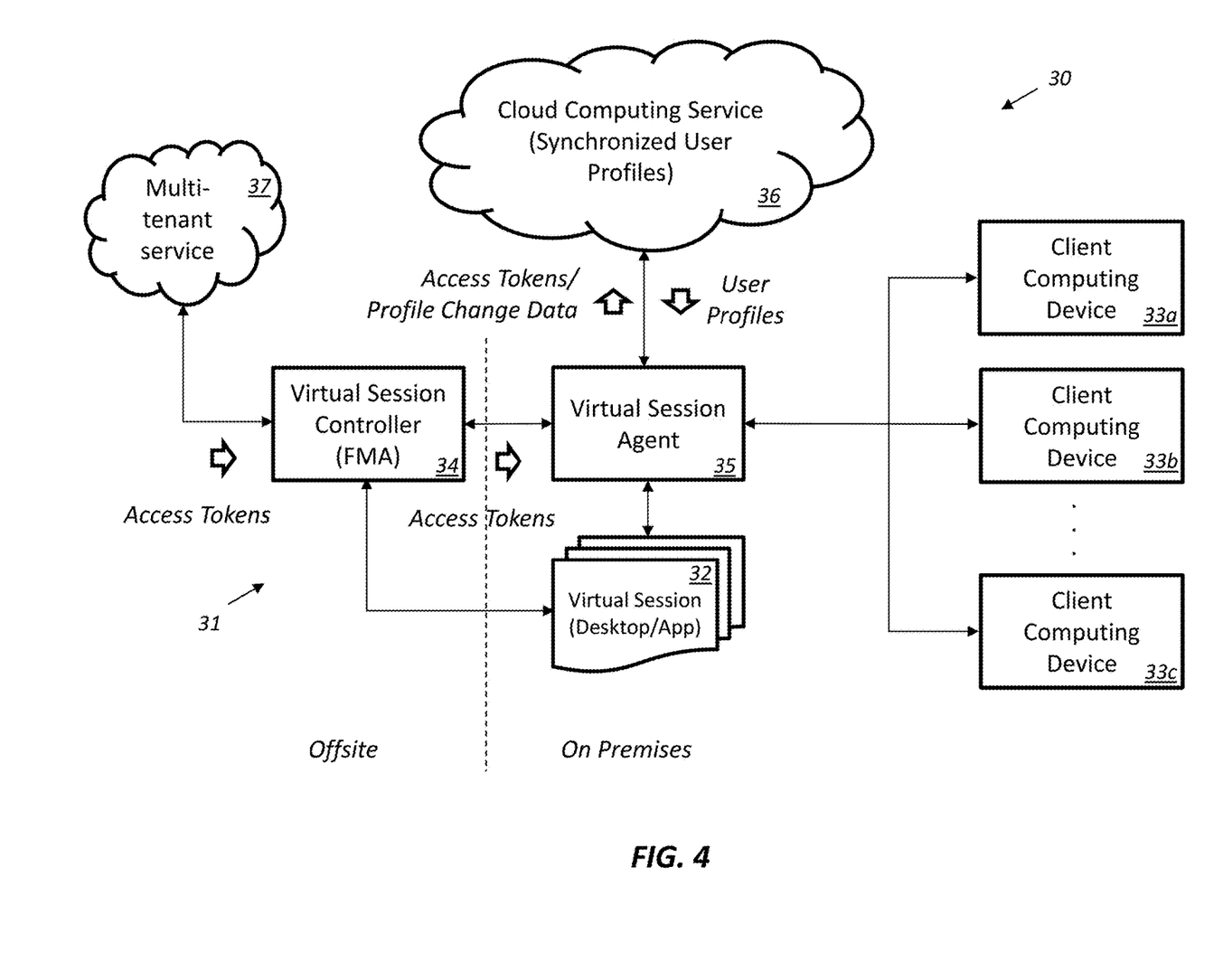
FIG. 4 is a schematic block diagram of another example computing system providing cloud-based user profile management for virtual computing sessions.
Figure 5:
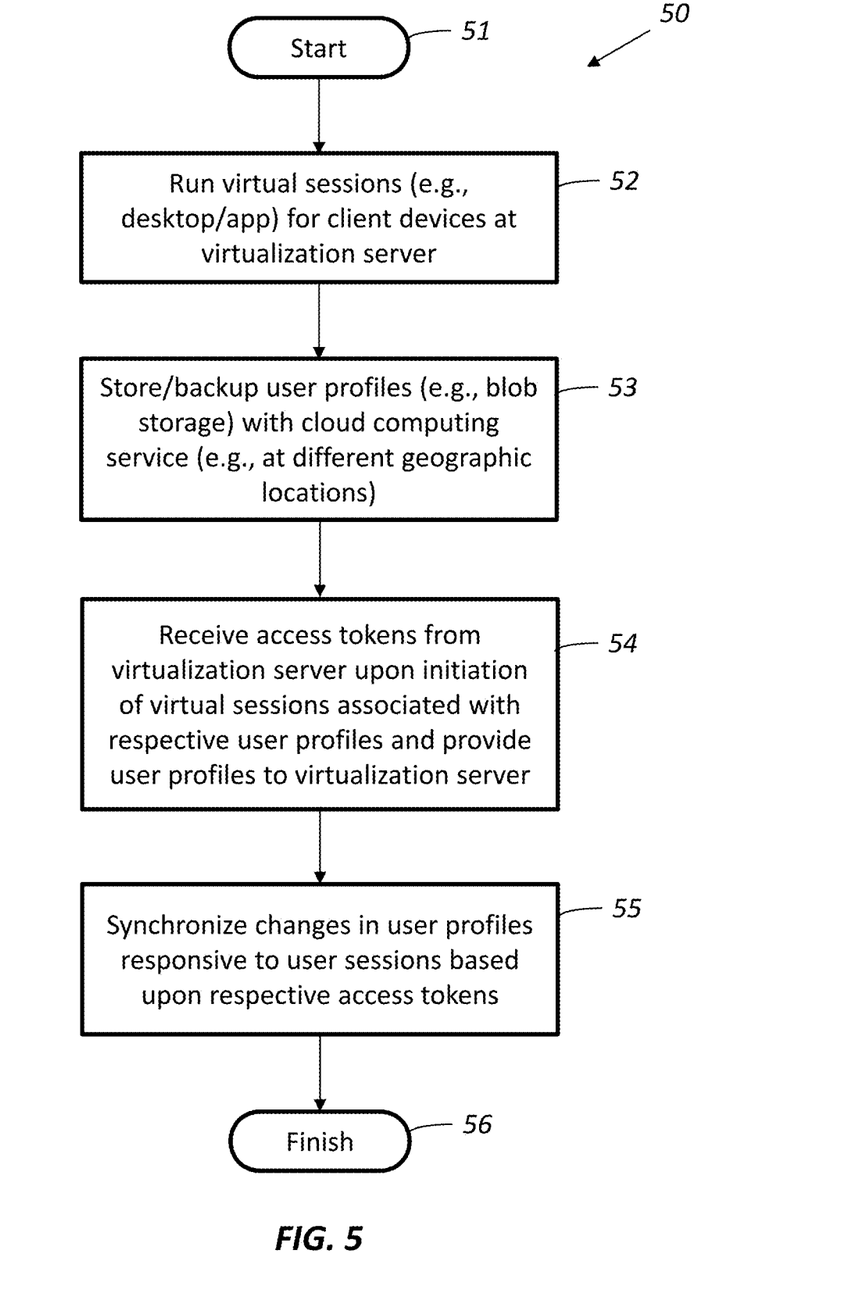
FIG. 5 is a flow diagram illustrating method aspects associated with the systems of FIGS. 3 and 4.

Turning now to FIG. 3-4 and the flow diagram 50 of FIG. 5, which begins at Block 51, a computing system 30 and associated method aspects are first described. The system 30 illustratively includes a virtualization server 31, such as the one described above, which is configured to run various types of virtual sessions 32 for a plurality of client computing devices 33a-33n (e.g., virtual desktop sessions and/or virtual application sessions). By way of example, the client computing devices 33a-33n may take various forms such as desktop computers, laptop computers, mobile computing devices such as tablets and smartphones, etc. It should be noted that while a single virtualization server 31 is shown in the illustrated example, more than one such server may be used in some embodiments to provide a distributed virtualization environment, if desired.

In the present example, the virtualization server 31 is "on premises" with respect to the client devices 33a-33n. That is, the various components of the virtualization server 31 may be hosted out of the same location where the client devices 33a-33n are used (e.g., out of a same office building, for example). More particularly, the virtualization server 31 illustratively includes a virtual session controller 34 to assign the virtual sessions 32 to the client devices 33a-33n, and a virtual session agent 35 to run the virtual sessions for respective client devices (Block 52). In one example implementation, the virtual session controller 34 may be implemented using the Desktop Delivery Controller (DDC), which is a server-side component of XENDESKTOP that is responsible for managing user access to the virtual sessions 32, plus brokering and optimizing connections. Furthermore, the virtual session agent 35 may be implemented using the Virtual Delivery Agent (VDA) from Citrix Systems, for example. The VDA enables connections to applications and desktops. The VDA is installed on the machines (here the server 31) that runs the applications or virtual desktops for the user. It enables the machines to register with the DDC and manage the High Definition eXperience (HDX) connection to a user device. However, it will be appreciated that other virtual session controllers/agents may be used in different embodiments.

By way of background, most operating systems keep a user profile folder per user where that user's documents, applications settings, and personalization options are stored. Generally, this is kept on the computer's local storage (e.g. C:\users\), but virtual desktops present a particular challenge, since users can log into any number of computers and their user profile needs to be replicated between all computers the user logs in to. In accordance with one example, the User Profile Management (UPM) system from Citrix Systems takes a Server Message Block (SMB) share address, and each user has a profile under it. On user logon, the UPM service on the VDA syncs the profile from this fileshare. The Microsoft roaming profile solution also works in a similar way, dependent on an SMB share. Traditionally a fileserver is set up by an IT administrator, and he is responsible for maintaining the same.

However, such an implementation may have certain issues. The first is with regard to file-server sizing, configuration and availability. Fileservers are typically hosted on virtual machines, whose various metrics (sizing/performance) have to be regularly monitored by an admin. Another issue is that regular backups of the fileserver are generally required, which again also requires an admin to complete. Furthermore, still another drawback is the relatively high availability requirement, in that an admin has to maintain multiple fileservers. If one goes down, there may be a downtime for all users. Another potential issue is when a profile gets corrupted. Typically when a user gets his profile corrupted, he calls up the admin. The admin has to go into the fileserver and either reset the profile or try to solve the issue in other ways. Here again, this involves admin intervention in addition to potential downtime. Thus, under typical profile management implementations, there is an expectation that the admin is responsible for both the fileserver and the user-profiles, although the profile management solution is not completely managed.

The system 30 advantageously overcomes the drawbacks of existing approaches by leveraging a cloud computing service 36 to provide for user profile storage and synchronization, so that the unique user profiles reside with the cloud computing service. More particularly, each user profile may be stored as a storage blob at one or more geographic locations of the cloud computing service 36, at Block 53. The cloud computing service 36 may be implemented using an existing third party cloud storage system, such as Azure Cloud Services from Microsoft Corp., although other cloud computing systems or even a dedicated cloud computing implementation for user profile management may be used in different embodiments.

As virtual sessions 32 are requested by users of the client computing devices 33a-33n, unique access tokens to the cloud computing service 36 may be securely communicated from the virtual session controller 34 to the virtual session agent 35 at user logon (Block 54). By way of example, the access token may be communicated via a Citrix Brokering Protocol (CBP) channel. CBP is a proprietary protocol between the session controller and session agent that provides brokering, management, and monitoring capabilities.

In the embodiment illustrated in FIG. 3, the access tokens are maintained by the on premises virtual session controller 34. However, in the embodiment illustrated in FIG. 4, the virtual session controller is not co-located on premises with the virtual session agent 35. That is, only the virtual session agent 35 is located on premises. In one example implementation, a Flexcast Management Architecture (FMA) service operating on the virtual session controller 34 may advantageously provide for communications with a multi-tenant cloud service endpoint 37 to receive the specifics of the access tokens. The FMA service may be configured as a relay between the multi-tenant cloud service endpoint 37 and the virtual session agent 35 for obtaining the access tokens, for example, although other approaches may be used in different embodiments. In some implementations, the virtual session agent 35 may also be off premises or remotely located (e.g., hosted in the cloud) along with the virtual session controller 34.

Furthermore, the virtual session agent 35 may also advantageously synchronize any changes made to the user profiles by the client computing devices 33a-33b during the virtual sessions to the cloud computing service 36 (e.g., the storage blob) using the appropriate access tokens, at Block 55, which illustratively concludes the method of FIG. 5 (Block 56). Yet, because different users have different access tokens, the user profiles remain secure with the cloud computing service 36. That is, this provides a profile management approach that may be completely managed (and secure) within the cloud computing service 36, with little or no required admin intervention from on premises IT personnel.

The system 30 may accordingly address many of the above-described problems with current password management systems. For example, the system 30 advantageously helps to overcome the "last-write-wins" problem, which may occur in password management systems where the entire profile is copied every time on logon/logoff (which causes profile corruption if a user is operating from multiple machines). With the above-described approach, a user profile may advantageously roam to different machines, because only the changes to the local profile are copied back to the cloud computing service 36 by the virtual session agent 35.

As noted above, the system 30 also advantageously allows for profile management to occur completely within the cloud without intervention from on premises IT personnel. Otherwise, an admin would need to keep track of file server size and maintenance using current approaches, which as noted above may be difficult and time consuming for them. Moreover, user-profile size bloating, etc., may advantageously be monitored by the cloud computing service 36 with notifications optionally provided to IT personnel via a cloud console, if desired. This gives admins the option to perform further operations or configuration on profiles via a cloud UI.

The system 30 also advantageously provides for automatic backups of user profiles and high availability leveraged from the cloud computing service 36. As noted above, the cloud computing service 36 may have a distributed server architecture providing the ability to store user profiles at numerous different geographic locations. As a result, user profiles may advantageously be stored at the closest or most efficient location with respect to the geographic location of the virtual session agent 35 location, for example. That is, the above-noted approach may be optimized to use the storage location in the same region as the virtual session agent 35. Moreover, this also allows for a more robust backup scheme, as user profiles may be backed up at different geographic locations to help ensure that any outage at one location does not restrict access to the user profiles at any time.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A virtualization server comprising:
  a memory and a processor cooperating with the memory to operate a virtual session controller configured to
    assign virtual sessions to a plurality of different client devices, each virtual session having a respective user profile associated therewith stored at a cloud computing service, the cloud computing service being distributed over a plurality of different geographic locations and configured to store the user profiles and backups thereof at different geographic locations,
    maintain a respective unique access token associated with each user profile separate from the client devices,
    relay the access tokens to a cloud computing service,
    receive the user profiles from the cloud computing service responsive to the unique access tokens, and
    synchronize changes to the user profiles stored at the cloud computing service responsive to the user sessions based upon the respective access tokens.

2. The virtualization server of claim 1 wherein the virtual session controller is remotely located from the client devices.

3. The virtualization server of claim 1 wherein the virtual session controller is on-premises with respect to the client devices.

4. The virtualization server of claim 1 wherein the cloud computing service is distributed over a plurality of different geographic locations and stores the user profiles at the different geographic locations based upon locations of respective users.

5. The virtualization server of claim 1 wherein the cloud computing service stores the user profiles as binary data in a single entity in a database.

6. The virtualization server of claim 1 wherein the virtual sessions comprise at least one of virtual desktop sessions and virtual application sessions.

7. A method comprising:
  operating a virtual session controller to
    assign virtual sessions to a plurality of different client devices, each virtual session having a respective user profile associated therewith stored at a cloud computing service, the cloud computing service being distributed over a plurality of different geographic locations and configured to store the user profiles and backups thereof at different geographic locations,
    maintain a respective unique access token associated with each user profile separate from the client devices,
    relay the access tokens to a cloud computing service,
    receive the user profiles from the cloud computing service responsive to the unique access tokens, and
    synchronize changes to the user profiles stored at the cloud computing service responsive to the user sessions based upon the respective access tokens.

8. The method of claim 7 wherein the virtual session controller is remotely located from the client devices.

9. The method of claim 7 wherein the virtual session controller is on-premises with respect to the client devices.

10. The method of claim 7 wherein the cloud computing service is distributed over a plurality of different geographic locations and stores the user profiles and backups thereof at different geographic locations.

11. The method of claim 7 wherein the cloud computing service stores the user profiles as binary data in a single entity in a database.

12. The method of claim 7 wherein the virtual sessions comprise at least one of virtual desktop sessions and virtual application sessions.

13. A non-transitory computer-readable medium having computer-executable instructions for causing a processor to perform steps comprising:
  operating a virtual session controller to
    assign virtual sessions to a plurality of different client devices, each virtual session having a respective user profile associated therewith stored at a cloud computing service, the cloud computing service being distributed over a plurality of different geographic locations and configured to store the user profiles and backups thereof at different geographic locations,
    maintain a respective unique access token associated with each user profile separate from the client devices,
    relay the access tokens to a cloud computing service,
    receive the user profiles from the cloud computing service responsive to the unique access tokens, and
    synchronize changes to the user profiles stored at the cloud computing service responsive to the user sessions based upon the respective access tokens.

14. The non-transitory computer-readable medium of claim 13 wherein the virtual session controller is remotely located from the virtual session agent.

15. The non-transitory computer-readable medium of claim 13 wherein the virtual session controller is on-premises with respect to the client devices.

16. The non-transitory computer-readable medium of claim 13 wherein the cloud computing service is distributed over a plurality of different geographic locations and stores the user profiles and backups thereof at different geographic locations.

17. The non-transitory computer-readable medium of claim 13 wherein the cloud computing service stores the user profiles as binary data in a single entity in a database.

* * * * *